United States Patent
Yoneda et al.

(10) Patent No.: US 7,126,247 B2
(45) Date of Patent: Oct. 24, 2006

(54) CONCENTRATED WINDING STATOR COIL FOR AN ELECTRIC ROTARY MACHINE

(75) Inventors: Shigenori Yoneda, Oobu (JP); Soichi Yoshinaga, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/114,056

(22) Filed: Apr. 26, 2005

(65) Prior Publication Data

US 2005/0236922 A1    Oct. 27, 2005

(30) Foreign Application Priority Data

Apr. 26, 2004   (JP)   .............................. 2004-130186

(51) Int. Cl.
- *H02K 17/00* (2006.01)
- *H02K 19/00* (2006.01)
- *H02K 21/00* (2006.01)
- *H02K 23/26* (2006.01)

(52) U.S. Cl. .................... 310/208; 310/71; 310/179
(58) Field of Classification Search ................ 310/179, 310/180, 182, 183, 189, 190
See application file for complete search history.

(56) References Cited

U.S. PATENT DOCUMENTS

| | | | |
|---|---|---|---|
| 5,196,752 A | * | 3/1993 | Palma .......................... 310/260 |
| 6,255,756 B1 | | 7/2001 | Richter |
| 6,787,959 B1 | * | 9/2004 | Weimer ....................... 310/184 |
| 2002/0163275 A1 | | 11/2002 | Hsu |
| 2003/0201688 A1 | * | 10/2003 | Yamamura et al. ......... 310/216 |

FOREIGN PATENT DOCUMENTS

| | | |
|---|---|---|
| EP | 0 920 107 A2 | 9/1999 |
| EP | 1 193 829 A2 | 4/2002 |
| FR | 2 830 994 | 4/2003 |
| JP | A 2001-186703 | 7/2001 |
| JP | A 2002-112484 | 4/2002 |
| JP | A 2002-305849 | 10/2002 |
| JP | 2003164081 A * | 6/2003 |

* cited by examiner

*Primary Examiner*—Darren Schuberg
*Assistant Examiner*—Erik Preston
(74) *Attorney, Agent, or Firm*—Oliff & Berridge PLC

(57) ABSTRACT

A concentrated winding stator coil of a proximal end extraction type two-layer winding arrangement includes numerous tooth coils which are connected in series to arrange serial coil units and also connected in parallel as pairs arranging respective phase windings. Plural inter-coil bus bars are provided to connect the tooth coils of the serial coil units. Plural terminal bus bars extend from both ends of the serial coil units to connect respective serial coil units in parallel with each other. These bus bars are disposed adjacently to an end face of a core back.

9 Claims, 9 Drawing Sheets

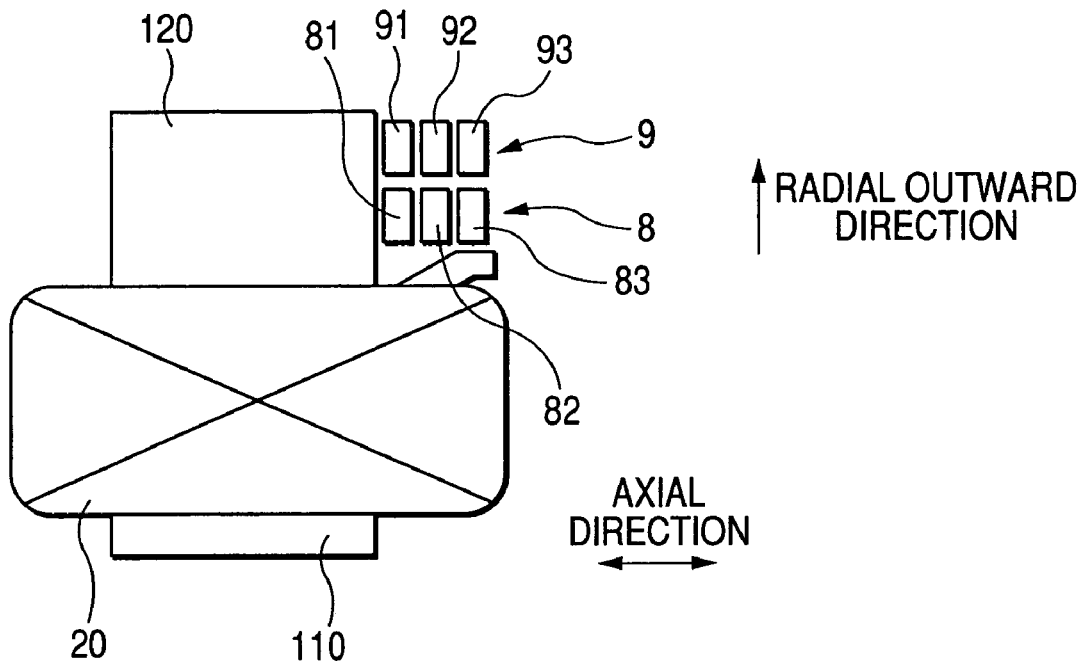
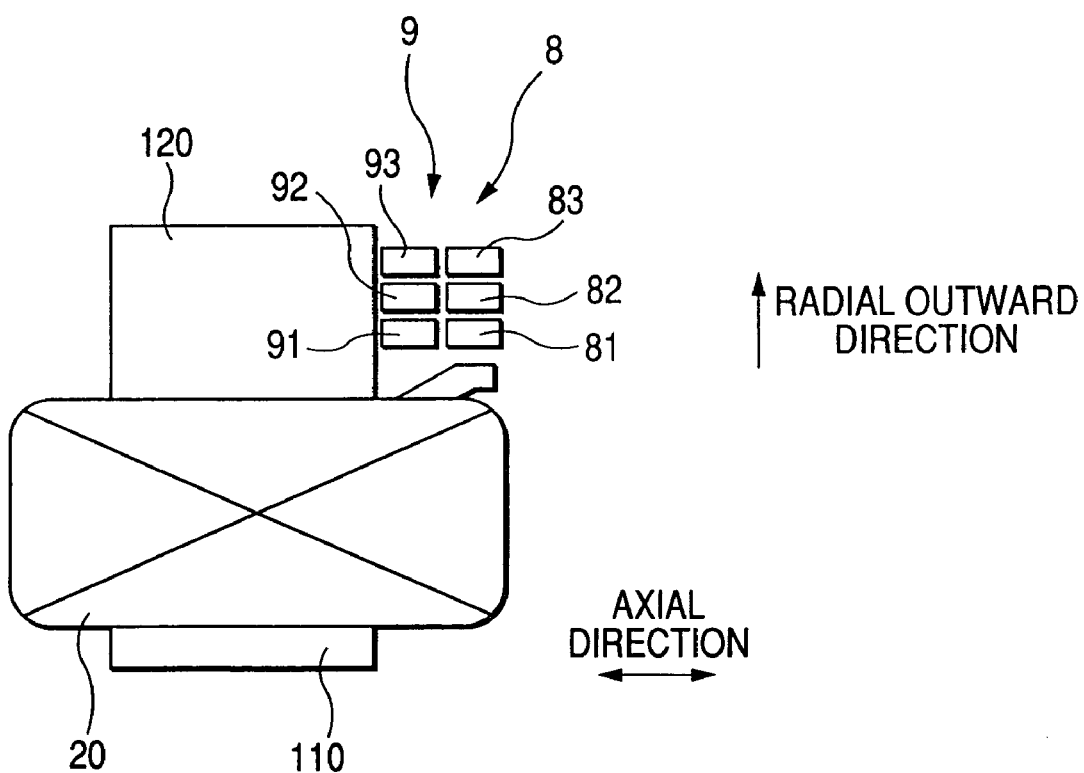

CONCENTRATED WINDING STATOR COIL FOR AN ELECTRIC ROTARY MACHINE

CROSS-REFERENCE TO RELATED APPLICATION

This application is based upon and claims the benefit of priority from earlier Japanese Patent Application No. 2004-130186 filed on Apr. 26, 2004 so that the description of which is incorporated herein by reference.

BACKGROUND OF THE INVENTION

This invention relates to a concentrated winding stator coil for an electric rotary machine.

A concentrated winding stator, conventionally proposed in the field of electric rotary machines, includes a plurality of phase windings each consisting of same phase coils connected with each other and wound in a concentrated manner around respective teeth of a stator core (hereinafter, referred to as tooth coils). From requirements of the winding work, this kind of concentrated winding stator is generally used for an assembled core which is formed by assembling separated partial cores of respective teeth into a stator core.

The tooth coils of a concentrated winding stator are wound around the teeth to have a required turn number. Two neighboring turns are usually disposed to be adjacent to each other in the axial direction on a circumferential surface of the tooth. Accordingly, the winding order for this concentrated winding stator is as follows.

First, the winding operation starts from one radial end side of a tooth to the other radial end side of this tooth to arrange a first layer coil. Then, turning the advancing direction, the winding operation restarts from the other radial end side of the tooth to the one radial end side of this tooth. Thus, a second layer coil is arranged on the first layer coil. Similarly, a third layer coil is arranged on the second layer coil so as to realize a highly densified winding. The first layer coil, the second layer coil, and the third layer coil are collectively referred to as "layer coils", in the following description.

The Japanese patent application Laid-open No. 2002-112484 (hereinafter referred to as prior art 1) proposes, in order to improve a slot space factor, alternately disposing tooth coils wound around teeth each having a trapezoidal cross section in the radial direction and tooth coils wound around teeth each having a rectangular cross section in the radial direction, based on the fact that the circumferential width of each tooth is constant and a slot is widened in the radial direction from its inside to the outside (refer to FIG. 9). The Japanese patent application Laid-open No. 2001-186703 (hereinafter referred to as prior art 1) discloses, as a tooth coil winding arrangement for a concentrated winding stator, a tooth coil with a starting end disposed at a proximal end portion (or distal end portion) of a tooth and a terminal end disposed at a distal end portion (or proximal end portion) of the tooth. Furthermore, this prior art document discloses, as another tooth coil winding arrangement, a tooth coil with starting and terminal ends being both disposed at the distal end portion of a tooth.

However, the tooth coils disclosed in the prior art 1 are complicated to manufacture. As the trapezoidal tooth coils have a large circumferential width, the axial length of a stator inevitably increases by an amount, corresponding to the axial length of this trapezoidal tooth coils. On the other hand, the tooth coils disclosed in the above-described prior art 2 have the following problems.

First, in the process of arranging a phase winding by connecting tooth coils of the same phase via crossovers in serial or parallel to each other, at least one end of each tooth coil is positioned at the distal end portion of the tooth. In the case of using short crossovers, the crossovers or lead wires extending from end portions of the tooth coils and connected to the crossovers will be positioned very closely to the circumferential surface of a rotor. If these wires are loosened and subjected to vibrations, there will be the possibility that the wires contact with the rotor or installation work for the rotor will become complicated. Furthermore, the connection by means of a crossover between one end of a tooth coil existing at the distal end portion of a tooth and one end of other tooth coil needs to be performed at the outside of an end face of the tooth in the axial direction. Thus, the axial length of the concentrated winding stator increases. Furthermore, the crossover needs to be disposed on the tooth coil wound around the tooth. Accordingly, the axial length of the stator further increases.

SUMMARY OF THE INVENTION

In view of the above-described problems, the present invention has an object to provide a compact concentrated winding stator coil for an electric rotary machine which includes phase windings arranged by tooth coils connected in series or parallel.

In order to accomplish the above and other related objects, the present invention provides a concentrated winding stator coil for an electric rotary machine including plural tooth coils respectively wound around teeth of a stator core. Each tooth coil includes a first layer coil, a second layer coil, a winding start end, and a winding terminal end. The first layer coil consists of plural turns arranged by successively winding an insulation coated coil conductor around a tooth of the stator core in a direction advancing from a proximal end portion to a distal end portion of the tooth to cooperatively form a same layer. The second layer coil consists of plural turns, including a start turn continuously returned from a final turn of the first layer coil, arranged by successively winding the insulation coated coil conductor on and around the first layer coil in a direction advancing from the distal end portion to the proximal end portion of the tooth to cooperatively form a same layer. The winding start end and the winding terminal end are disposed at the proximal end portion of the tooth. And, a pair of lead wire portions extends from the winding start end and the winding terminal end toward a core back of the stator core. The concentrated winding stator coil for an electric rotary machine of this invention is referred to as a proximal end extraction type two-layer winding concentrated winding stator coil.

According to this proximal end extraction type two-layer winding coil, the tooth coil includes a pair of layer coils (i.e. the first layer coil and the second layer coil) formed by winding the coil conductor around the tooth in the direction advancing from one end of the tooth adjacent to the core back (i.e. the proximal end portion of the tooth) to the distal end portion of the tooth and then winding in the opposite direction advancing from the distal end portion to the proximal end portion. It is possible to successively dispose one or more pairs of layer coils if necessary. In short, an even layer coils are wound around the tooth. According to this arrangement, both of the winding start end and the winding terminal end of the tooth coil can be disposed at the proximal end portion of the tooth, i.e. at the side adjacent to the core back. The length of a crossover connecting one tooth coil to other tooth coil can be shortened. The resistance loss in the crossover can be minimized, and accordingly heat generation can be suppressed adequately. The crossovers and the connecting portions of the crossovers and the lead wires of the tooth coils are located far from the cylindrical surface of the rotor. Thus, it becomes possible to prevent the wires from contacting with the rotor. The rotor can be easily installed in its housing. Furthermore, it becomes possible to prevent the axial length of the stator from increasing because the winding start end and the winding terminal end of tooth coil can be located at the proximal end side of the tooth and the lead wires of the tooth coils or the crossovers are located closely to the end face of the core back of the stator core.

According to the present invention, in the proximal end extraction type two-layer winding coil, a phase winding includes plural serial coil units connected in parallel with each other, and each serial coil unit consists of plural tooth coils being mutually connected in series. This serial/parallel connection of the tooth coils can increase the degree of freedom in the design of stator coils. Thus, the serial/parallel combination of the tooth coils can be adequately determined or changed considering the circuitry specs, such as armature voltage and armature current, as well as the physical specs including conductor cross section of the tooth coil.

Furthermore, according to the present invention, in the proximal end extraction type two-layer winding coil including tooth coils being connected in serial and parallel with each other to constitute phase windings (hereinafter, referred to as a serial/parallel proximal end extraction type two-layer winding coil), the phase winding further includes plural inter-coil bus bars, and plural terminal bus bars. The plural inter-coil bus bars serve as inter-coil connection wires for connecting the tooth coils of the serial coil units. The plural terminal bus bars serve as unit terminal connection wires extending from both ends of the serial coil units for connecting the serial coil units in parallel with each other. And, the inter-coil bus bars and the terminal bus bars are disposed adjacently to an end face of the core back.

In this specification, the inter-coil connection wires and the unit terminal connection wires are simply referred to as "crossovers", and are arranged by bus bars. The bus bars arranging the inter-coil connection wires are referred to as inter-coil bus bars. The bus bars arranging the unit terminal connection wires are referred to as terminal bus bars.

According to this arrangement, the electric resistance of the bus bar (i.e. crossover) connecting the teeth can be reduced. Furthermore, utilizing the structural features that the tooth coils of teeth protrude in the axial direction than the teeth or the end face of the core back, the bus bars (crossovers) can be disposed outside these tooth coils in the radial direction. The axial thickness of a concentrated winding stator can be suppressed. It becomes possible to realize a serial/parallel proximal end extraction type two-layer winding coil which is preferably used for a thin motor and is accordingly capable of realizing a compact and light-weight body. This serial/parallel proximal end extraction type two-layer winding coil, as described later, can realize tooth coils each having a turn number equivalent to an odd number. Thus, the degree of freedom in designing the armature can be improved.

According to a preferred embodiment of the present invention, the electric rotary machine is a three-phase AC electric rotary machine. The serial coil units of the phase winding include a first serial coil unit and a second serial coil unit connected in parallel with each other for each phase. Each of the first serial coil unit and the second serial coil unit consists of plural tooth coils being mutually connected in series. First bus bar groups, each including the inter-coil bus bar and the terminal bus bar for the first serial coil unit of each phase, are disposed adjacently to an end face of the core back and mutually spaced with predetermined clearances in a radial direction according to a predetermined phase order. And, second bus bar groups, each including the inter-coil bus bar and the terminal bus bar for the second serial coil unit of each phase, are disposed adjacently to an axial end of respective first bus bar groups and mutually spaced with predetermined clearances in the radial direction according to a predetermined phase order.

According to this arrangement, the above-described various bus bars can be spatially disposed for respective phases and for serial coil units so as to realize a compact bus bar arrangement. Furthermore, connections of the bus bars and external connection phase terminals or connections of the bus bars and lead wires of the tooth coils can be collectively performed on one end face of the stator core. Thus, the wire connecting work can be simplified. In the case that the stator coils are star-connected, it is preferable to dispose neutral bus bars so as not to interfere with phase bus bars in the same annular bus bar accommodation space when the bus bars of respective phases are disposed separately in a predetermined phase order. It is however possible to newly provide a space for the neutral bus bars. Preferably, respective bus bars are accommodated in a bus bar holder fixed to an axial end face of the core back, and the bus bar holder has grooves for accommodating the bus bars of respective phases. According to this embodiment, the bus bars of respective phases can be simply and densely disposed.

According to a preferred embodiment of the present invention, the electric rotary machine is a three-phase AC electric rotary machine. The serial coil units of the phase winding include a first serial coil unit and a second serial coil unit connected in parallel with each other for each phase. Each of the first serial coil unit and the second serial coil unit consists of plural tooth coils being mutually connected in series. First bus bar groups, each including the inter-coil bus bar and the terminal bus bar for the first serial coil unit of each phase, are disposed from a position adjacent to an end face of the core back and mutually spaced with predetermined clearances in an axial direction according to a predetermined phase order. And, second bus bar groups, each including the inter-coil bus bar and the terminal bus bar for the second serial coil unit of each phase, are disposed from a position adjacent to the end face of the core back and mutually spaced with predetermined clearances in the axial direction according to a predetermined phase order.

According to this arrangement, the above-described various bus bars can be spatially disposed for respective phases and for serial coil units so as to realize a compact bus bar arrangement. Furthermore, connections of the bus bars and external connection phase terminals or connections of the bus bars and lead wires of the tooth coils can be collectively performed on one end face of the stator core. Thus, the wire connecting work can be simplified. In the case that the stator coils are star-connected, it is preferable to dispose neutral bus bars so as not to interfere with phase bus bars in the same annular bus bar accommodation space when the bus bars of respective phases are disposed separately in a predetermined phase order. It is however possible to newly provide a space for the neutral bus bars. Preferably, respective bus bars are accommodated in a bus bar holder fixed to an axial end face of the core back, and the bus bar holder has grooves for accommodating the bus bars of respective phases. According to this embodiment, the bus bars of respective phases can be simply and densely disposed.

According to a preferred embodiment of the present invention, the electric rotary machine is a three-phase AC electric rotary machine. The serial coil units of the phase winding include a first serial coil unit and a second serial coil unit connected in parallel with each other for each phase. Each of the first serial coil unit and the second serial coil unit consists of plural tooth coils being mutually connected in series. First bus bar groups, each including the inter-coil bus bar and the terminal bus bar for the first serial coil unit of each phase, are disposed adjacently to one end face of the core back. And, second bus bar groups, each including the inter-coil bus bar and the terminal bus bar for the second serial coil unit of each phase, are disposed adjacently to the other end face of the core back.

According to this arrangement, the above-described various bus bars can be spatially disposed for respective phases and for serial coil units so as to realize a compact bus bar arrangement. Especially, the first bus bar group and the second bus bar group can be spatially separated from each other. The bus bars of the second bus bar group do not interfere with the connection of the bus bars of the first bus bar group and the lead wires of the tooth coils. The bus bars of the first bus bar group do not interfere with the connection of the bus bars of the second bus bar group and the lead wires of the tooth coils. The connection of the bus bars and the lead wires of the tooth coils for realizing the serial/parallel connection can be simplified and the bus bars can be disposed adjacently to the end faces of the core back. Furthermore, the space volume available for accommodating the bus bars is doubled and accordingly the work for disposing the bus bars can be simplified.

Furthermore, in the case that the stator coils are star-connected, it is preferable to dispose neutral bus bars so as not to interfere with phase bus bars in the same annular bus bar accommodation space when the bus bars of respective phases are disposed separately in a predetermined phase order. It is however possible to newly provide a space for the neutral bus bars. Preferably, respective bus bars are accommodated in a bus bar holder fixed to an axial end face of the core back, and the bus bar holder has grooves for accommodating the bus bars of respective phases. According to this embodiment, the bus bars of respective phases can be simply and densely disposed.

According to a preferred embodiment of the present invention, the terminal bus bars of the first bus bar groups of respective phases are connected to the terminal bus bars of the second bus bar groups of corresponding phases at positions adjacent to an outer cylindrical surface of the stator core. This arrangement is effective in reducing the difference between the electric resistance of the serial coil units belonging to the first bus bar group and the electric resistance of the serial coil units belonging to the second bus bar group.

According to a preferred embodiment of the present invention, the terminal bus bars of either the first bus bar group or the second bus bar group extend in slots of the stator core and are connected to the terminal bus bars of the other of the first and second bus bar groups. This arrangement brings the effect of suppressing increase in size and length of the electric rotary machine because the inside space of the stator core can be effectively utilized for the bus bars (usually, the terminal bus bars) connecting the first bus bar group and the second bus bar group.

According to a preferred embodiment of the present invention, respective bus bars belonging to the first bus bar groups and the second bus bar groups are disposed so as to offset toward the stator core from the teeth in the axial direction than the surface of the tooth coils. According to this arrangement, respective bus bars do not protrude than the tooth coils in the axial direction. Thus, the axial length of the stator can be minimized.

According to a preferred embodiment of the present invention, each of the tooth coils has a turn number which can be regarded as being equivalent to an odd turn number if all of the tooth coils arranging the phase winding are connected in series. According to this arrangement, it becomes possible to provide a tooth coil having substantially an odd turn number while assuring the advantages of the proximal end extraction type two-layer winding arrangement. The degree of freedom in designing an electric rotary machine using a concentrated winding stator can be increased.

More specifically, it is now supposed that "i" represents the current flowing in the phase winding, "N" represents a turn number of the tooth coil, and the phase winding is arranged by serially connecting a total of "Y" tooth coils in parallel with each other. According to this arrangement, the phase current flowing in each tooth coil decreases to 1/Y level. This is equivalent to the reduction in the ampere-turn of one tooth coil from Ni to Ni/Y. In other words, this is equivalent to the reduction in the turn number of the tooth coil from N to N/Y. Accordingly, even if an actual turn number of the tooth coil is an even number, it is possible to realize a turn number that can be regarded as an odd number electromagnetically. For example, it is further supposed that the tooth coil has 30 turns and the phase windings, each consisting of 6 tooth coils, are connected in parallel with each other. According to this arrangement, the turn number of the tooth coil can be regarded as being substantially identical with 5 turns. Furthermore, according to the preferred embodiment of the present invention, the phase winding is arranged by connecting two serial coil units in parallel with each other. This arrangement brings the effect of suppressing reduction in the current flowing in each tooth coil because the number of parallel units is 2 (i.e. the minimum number). Accordingly, it becomes possible to reduce the turn number of a tooth coil required for assuring an ampere-turn required for one tooth coil. The winding work of the tooth coil can be simplified. The coil resistance can be reduced.

BRIEF DESCRIPTION OF THE DRAWINGS

The above and other objects, features and advantages of the present invention will become more apparent from the following detailed description which is to be read in conjunction with the accompanying drawings, in which:

FIG. 5 is a cross-sectional view partly and schematically showing a bus bar arrangement for the three-phase wiring in accordance with a second embodiment of the present invention, taken along the plane including the axis of the stator core;

FIG. 6 is a cross-sectional view partly and schematically showing a bus bar arrangement for the three-phase wiring in accordance with a third embodiment of the present invention, taken along the plane including the axis of the stator core;

DESCRIPTION OF THE PREFERRED EMBODIMENTS

Preferred embodiments of the present invention will be explained hereinafter with reference to attached drawings.

A serial/parallel proximal end extraction type two-layer winding coil will be explained in accordance with preferred embodiments of the present invention.

FIRST EMBODIMENT

Overall Structure

Figure 1:
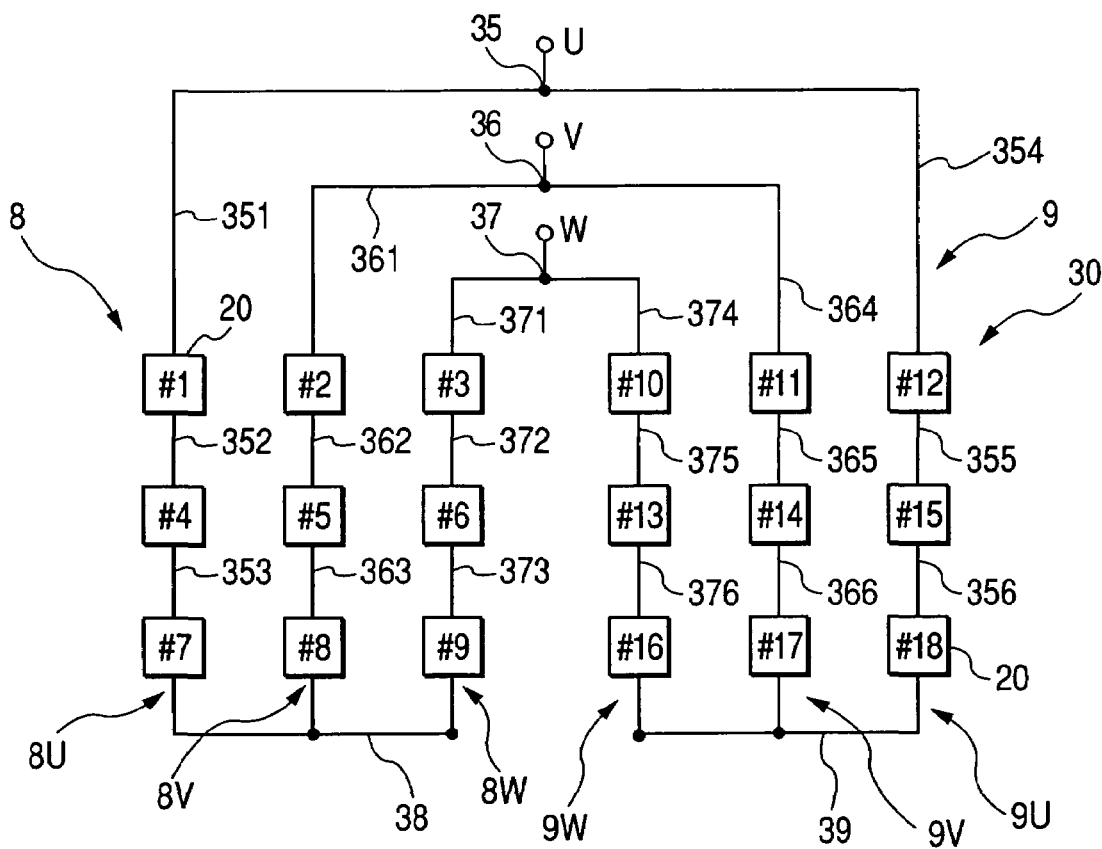
FIG. 1 is a three-phase wiring diagram used in a first embodiment of the present invention.

A concentrated winding stator having serial/parallel proximal end extraction type two-layer winding coils in accordance with a first embodiment of the present invention will be explained with reference to FIG. 1 showing a wiring arrangement and FIG. 2 partly showing a front view of the stator. A stator core 100 consists of a total of eighteen teeth 110 and a single core back 120. The stator core 100 is arranged by multilayered electromagnetic steel plates. The stator core 100 has an assembled core structure, although FIG. 2 does not show the details of the assembled core structure.

Each tooth 110 protrudes inward in the radial direction from an inner cylindrical surface of the core back (i.e. yoke) 120. The teeth 110 are disposed at constant angular pitches in the circumferential direction. Each tooth 110 has a partially cylindrical surface located at the radial inner side thereof so as to confront with a rotor (not shown). Tooth coils 20 are wound around respective teeth 110 so as to form three-phase stator coils. The three-phase stator coils have external connecting terminals 35 to 37 to which three-phase AC voltages are applied. The eighteen tooth coils 20, each being wound around a tooth 110, are classified into three groups each consisting of six tooth coils of the same phase. Accordingly, one pole-pair of the rotor (not shown) has a circumferential pitch corresponding to 3 tooth coils.

Tooth Coil 20

Next, the tooth coil 20 will be explained in more detail with reference to FIG. 2. The tooth coil 20 is a flat type copper wire sheathed with a resin coating film and wound around a corresponding tooth 110 so as to form two layers of the coil. More specifically, the tooth coil 20 consists of a first layer coil 21 wound around the tooth 110, a second layer coil 22 wound on and around the first layer coil 21, a lead wire 23 extending from a winding start end of the first layer coil 21, and a lead wire 24 extending from a winding terminal end of the second layer coil 22. Each tooth 110 has a square rod shape. Thus, the first layer coil 21 and the second layer coil 22 of the tooth coil 20, when wound around the tooth 110, form a rectangular coil shape with four straight edges. Among four edges, the axial end face of the stator core 100 is referred to as a front edge from which the lead wires 23 and 24 are extended.

Figure 2:
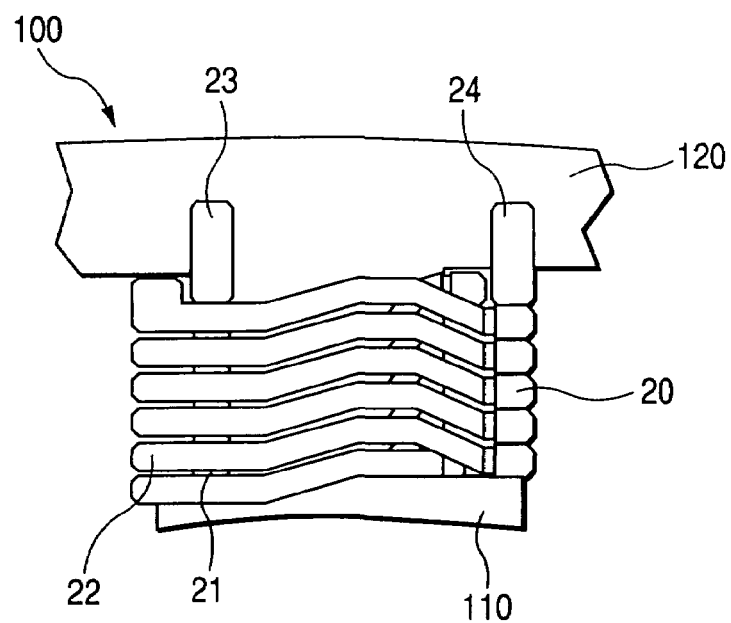
FIG. 2 is a front view partly showing a stator in accordance with the first embodiment of the present invention.

The lead wires 23 and 24, as shown in FIG. 2, are disposed at both sides of the intervening tooth 110 in the circumferential direction.

Furthermore, both of the lead wires 23 and 24 are disposed at the same end of the tooth 110 in the axial direction. The lead wires 23 and 24 are extended outward in the radial direction along one end face of the core back 120. More specifically, the lead wire 23 extends inward in the radial direction along the core back 120 and reaches a proximal end portion of the tooth 110. Then, the lead wire 23 is bent perpendicularly toward the back of the drawing sheet so as to merge into the winding start end of the first layer coil 21. On the other hand, the lead wire 24 extends inward in the radial direction along the core back 120 and reaches the proximal end portion of the tooth 110. Then, the lead wire 24 is bent perpendicularly toward the back of the drawing sheet so as to merge into the winding terminal end of the second layer coil 22. Each of the first layer coil 21 and the second layer coil 22 has 5 turns. The tooth coil 20 has 10 turns. Respective turns of the first layer coil 21 are disposed on the tooth 110 to form a same layer cooperatively in a direction advancing from the proximal end portion to the distal end portion of the teeth 110. The second layer coil 22 has a start turn connected to and returned from a final turn of the first layer coil 21. Respective turns of the second layer coil 22 are disposed on the first layer coil 21 to form a same layer cooperatively in a direction advancing from the distal end portion to the proximal end portion of the teeth 110. Namely, each tooth coil 20 has the winding start end and the winding terminal end which are respectively disposed at the proximal end portion of the tooth 110.

According to this arrangement, both of the winding start end and the winding terminal end of the tooth coil 20 can be disposed at the proximal end portion of the tooth 110, i.e. at the side adjacent to the core back 120. The length of a crossover connecting one tooth coil 20 to other tooth coil 20 can be shortened. The resistance loss in the crossover can be minimized, and accordingly heat generation can be suppressed adequately. The crossovers and the connecting portions of the crossovers and the lead wires 23 and 24 of the tooth coils 20 are located far from the cylindrical surface of the rotor. Thus, it becomes possible to prevent the wires from contacting with the rotor. The rotor can be easily installed in its housing. Furthermore, it becomes possible to prevent the axial length of the stator from increasing because the lead wires 23 and 24 of the tooth coils 20 or the crossovers do not ride on the tooth coils 20. Furthermore, according to this embodiment, there is no substantial dislocation or offset between circumferential extracting positions of a pair of lead wires 23 and 24 extended from the winding start end and the winding terminal end of the tooth coil 20 toward the core back of the stator core 100. Thus, the wire connection work becomes easier in connecting the lead wires 23 and 24 with the crossovers.

Furthermore, according to this embodiment, the winding start end and the winding terminal end of the tooth coil 20 are disposed at both sides of the proximal end portion of the tooth 110 in the circumferential direction. The lead wires 23 and 24 are extended in the direction advancing from the proximal end portion of the tooth 110 to the core back of the stator core from circumferential both sides of the tooth 110. The lead wire 23 extending from the winding start end of the tooth coil 20 and the lead wire 24 extending from the winding terminal end of the tooth coil 20 can be easily bent toward the radial direction by utilizing an edged portion of the core back 120 facing to a slot bottom portion. As a sufficient clearance is secured between these lead wires 23 and 24, terminals of the lead wires can be easily processed. Furthermore, according to this embodiment, two lead wires 23 and 24 are positioned at the same side in the axial direction with respect to the core back 120 when these lead wires 23 and 24 are extended from the circumferential both ends of the proximal end portion of the tooth 110. Thus, the lead wires 23 and 24 of the tooth coil 20 can be connected with the crossovers disposed between the teeth (including crossovers defining a neutral point) at one side of the core back 120 in the axial direction. The connection work becomes easier.

Arrangement of Phase Winding

A three-phase winding structure arranged by the tooth coils 20 will be explained with reference to FIG. 1. The three phase windings, each consisting of six (i.e. 18/3) tooth coils 20 of the same phase, are star-connected (or delta-connected). FIG. 1 shows the tooth coils 20 which are respectively given serial numbers #1 to #18 and are disposed successively in a clockwise direction.

Respective phase windings are arranged by connecting a first phase winding group 8 (including a neutral bus bar 38) and a second phase winding group 9 (including a neutral bus bar 39) in parallel with each other and further connecting these winding groups 8 and 9 to external connecting terminals 35 to 37.

The first phase winding group 8 consists of a U-phase serial coil unit 8U, a V-phase serial coil unit 8V, and a W-phase serial coil unit 8W. The second phase winding group 9 consists of a U-phase serial coil unit 9U, a V-phase serial coil unit 9V, and a W-phase serial coil unit 9W.

Each of the serial coil units 8U to 9W is arranged by serially connecting three tooth coils 20. Accordingly, the serial coil units 8U and 9U being connected in parallel with each other cooperatively form a U-phase winding. The serial coil units 8V and 9V being connected in parallel with each other cooperatively form a V-phase winding. The serial coil units 8W and 9W being connected in parallel with each other cooperatively form a W-phase winding.

According to this arrangement, it becomes possible to suppress reduction in the current flowing in each tooth coil 20. It becomes possible to provide the tool coils 20 regarded as having an odd turn number if serially connected with each other. Namely, each phase winding shown in FIG. 1 is equivalent to the phase winding of six serially connected tooth coils 20 each having 5 turns, when seen from the outside. Accordingly, the tooth coil 20 can have odd turns even if the proximal end extraction type two-layer winding coil structure shown in FIG. 2 is employed. In other words, in a case that respective tooth coils 20 have 10 turns, each tooth coil 20 is regarded as having 5 turns when they are connected in series. Accordingly, in the design of an armature, it is possible to determine the specs on the assumption that the tooth coil 20 facing to each pole-pair of the rotor has odd turns. According to this embodiment, three tooth coils 20 having mutually different phases and arranged successively face to one pole-pair of the rotor.

In the case of increasing the number of parallel circuits, wiring of the crossover becomes complicated, the turn number of each tooth coil 20 increases, and the slot space factor decreases. Hence, this embodiment reduces the number of parallel circuits to a minimum value (i.e. two) to suppress this problem.

Furthermore, as the parallel circuit number is 2, it is preferable to dispose a crossover bus bar extending to one serial coil unit in the clockwise direction and another crossover bus bar extending to other serial coil unit in the counterclockwise direction, from respective external connecting terminals 35 to 37. The bus bar arrangement can be simplified.

Wiring Structure of Bus Bars

Figure 4:
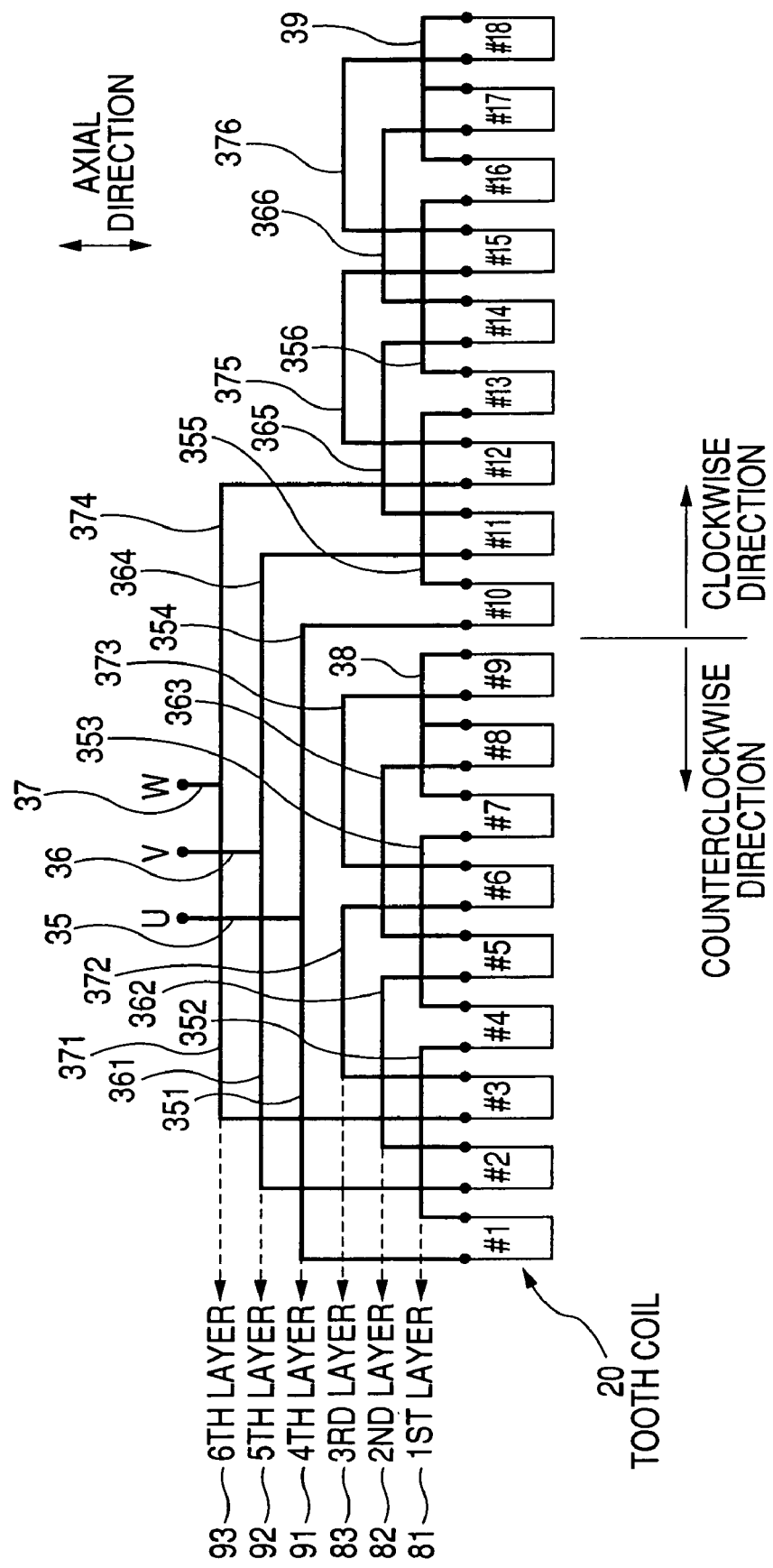
FIG. 4 is a diagram showing a bus bar arrangement for the three-phase wiring shown in FIG. 1.

Next, the method for disposing the crossover bus bar will be explained with reference to an expansion plan view of the phase winding shown in FIG. 4. FIG. 4 shows a total of eighteen tooth coils 20 assigned the serial numbers #1, #2, - - - #18.

Plural bus bars, respectively connecting the first phase winding group 8 and the second phase winding group 9, are disposed at one end face of the stator core 100 in the axial direction. Among a total of six bus bars 351 to 356 used for the U-phase winding group, the bus bars 351 to 353 belong to the first phase winding group 8 and the bus bars 354 to 356 belong to the second phase winding group 9. Among a total of six bus bars 361 to 366 used for the V-phase winding group, the bus bars 361 to 363 belong to the first phase winding group 8 and the bus bars 364 to 366 belong to the second phase winding group 9. Among a total of six bus bars 371 to 376 used for the W-phase winding group, the bus bars 371 to 373 belong to the first phase winding group 8 and the bus bars 374 to 376 belong to the second phase winding group 9.

As shown in FIG. 4, the bus bars 351–356, 361–366, and 371–376 are successively disposed in the axial direction to form a total of six layers. Neutral bus bars 38 and 39 are disposed together with the U-phase winding bus bars 352, 353, 355, and 356 to form the same layer in the axial direction, so as not to interfere with each other. In other words, the neutral bus bars 38 and 39 are located at the circumferential position where the U-phase winding bus bars 352, 353, 355, and 356 are not present.

Figure 3:
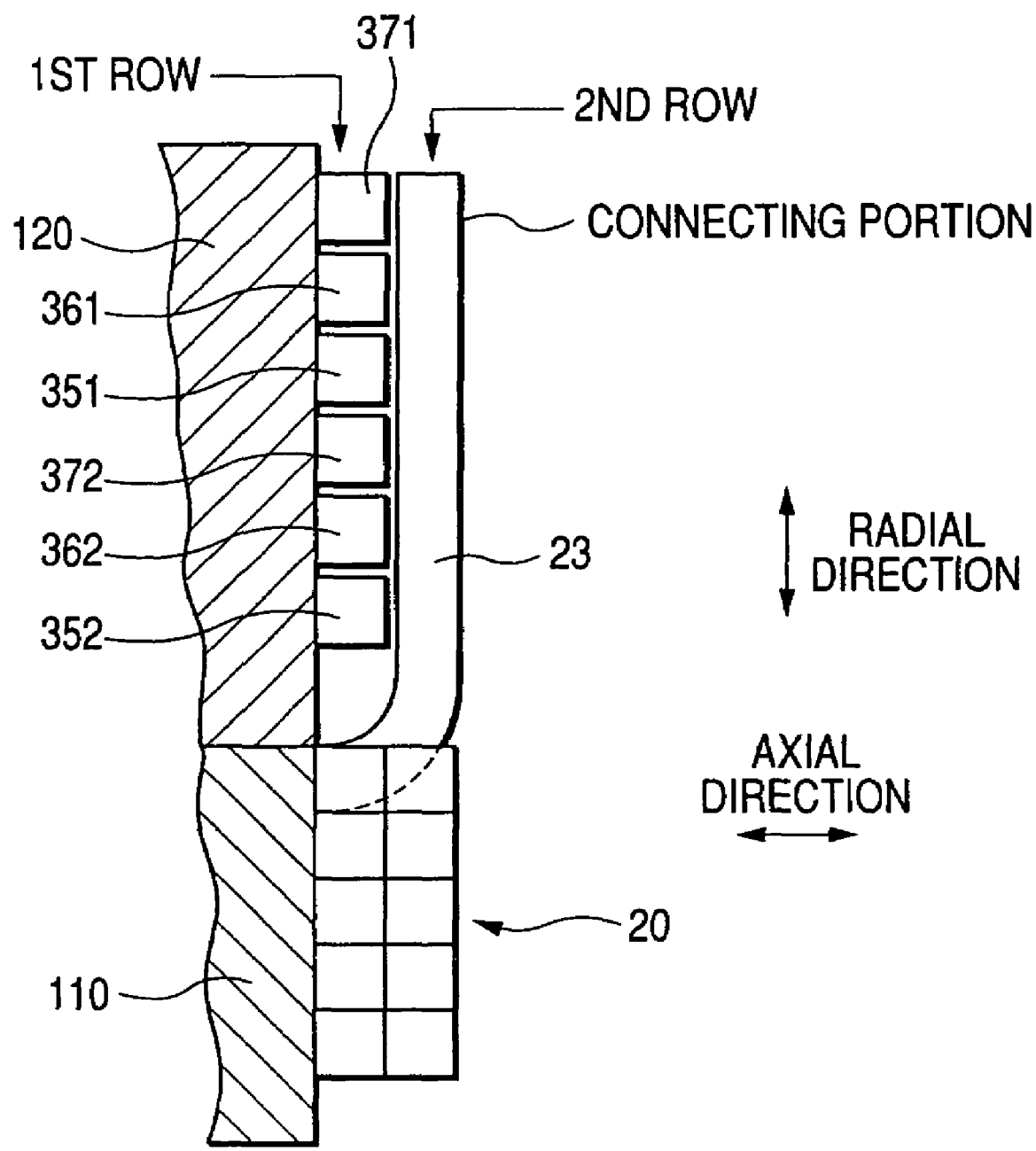
FIG. 3 is a cross-sectional view partly and schematically showing a bus bar arrangement for the three-phase wiring in accordance with the first embodiment of the present invention, taken along a plane including an axis of a stator core.

FIG. 3 shows the spatial arrangement of the lead wire of the tooth coil 20 and the bus bars. As shown in FIG. 3, the bus bars 352, 362, 372, 351, 361, and 371, each serving as the crossover extending in the circumferential direction, are successively disposed to form six layers in the radial direction adjacently to and along an end face of the core back 120. The crossover bus bar positioned at the innermost end in the radial direction arranges a first layer. The crossover bus bar positioned at the outermost end in the radial direction arranges a sixth layer. However, it is unnecessary to dispose the bus bars shown in FIG. 3 at the same position in the circumferential direction.

The lead wire 23 of the tooth coil 20 is extended outward in the radial direction from the tooth coil 20 along the crossover bus bars 352, 362, 372, 351, 361, and 371. Although not shown in the drawing, the lead wire 24 is similarly disposed. The lead wire 23 shown in FIG. 3 is connected to the bus bar 371. More specifically, according to this embodiment, there is the space available for the wiring outside the end face of the core back 120. This space includes a first row space and a second row space positioned in the axial direction. The first row space is used for the crossover bus bars 352, 362, 372, 351, 361, and 371 each extending in the circumferential direction so as to form six layers in the radial direction. The second row space is used for the lead wires 23 and 24 extend outward in the radial direction. Thus, the lead wires 23 and 24 extending outward in the radial direction do not spatially interfere with the crossover bus bars extending in the circumferential direction. The bus bars and the lead wires can be easily connected.

Furthermore, according to this embodiment, the tooth coils #1 to #9 arranging the first phase winding group 8 are disposed at the left side and the tooth coils #10 to #18 arranging the second phase winding group 9 are disposed at the right side in the circumferential direction. The boundary between the tooth coils #9 and the tooth coil #10 is a boundary of the first phase winding group 8 and the second phase winding group 9. Accordingly, this embodiment provides a simple wiring arrangement that the bus bars of the first phase winding group 8 can share a 180-degree region of the ring-shaped end face of the core back 120 and the bus bars of the second phase winding group 9 can share another 180-degree region.

Furthermore, according to this embodiment, the bus bars consisting of the first phase winding group 8 are arranged in a multilayered structure so as to have different axial positions for respective phases. Similarly, the bus bars consisting of the second phase winding group 9 are arranged in a multilayered structure so as to have different axial positions for respective phases. Furthermore, the bus bars of the same phase are disposed at the same axial position to form the same layer in each of the first phase winding group 8 and the second phase winding group 9. Accordingly, it is preferable to accommodate these bus bars in a bus bar holder having a total of six bus bar accommodation grooves successively arrayed in the axial direction. This bus bar holder is fixed to one end face of the core back. According to this arrangement, even in a case that respective phase windings are arranged by connecting numerous tooth coils 20 in serial and parallel, the bus bar arrangement becomes compact and the required space is small.

According to the above-described embodiment, each tooth coil 20 is arranged to have two layers. However, as far as the tooth coil 20 has even layers other than 2, it is possible to dispose both the winding start end and the winding terminal end of the tooth coil 20 at the proximal end portion of the tooth 110, i.e. adjacently to the core back 120. For example, it is possible to form each tooth coil 20 to have 30 turns of 6 layers.

SECOND EMBODIMENT

A winding stator coil in accordance with a second embodiment of the present invention will be explained with reference to FIG. 5 which schematically shows one tooth coil 20 fixed to the stator core. FIG. 5 shows an arrangement for the first-layer bus bar group 81, the second-layer bus bar group 82, the third-layer bus bar group 83, the fourth-layer bus bar group 91, the fifth-layer bus bar group 92, and the sixth-layer bus bar group 93 respectively shown in FIG. 4.

More specifically, the bus bar group 81 consists of the first-layer bus bars 352, 353, 38, 355, 356, and 39 shown in FIG. 4. The bus bar group 82 consists of the second-layer bus bars 362, 363, 365, and 366 shown in FIG. 4. The bus bar group 83 consists of the third-layer bus bars 372, 373, 375, and 376 shown in FIG. 4. Furthermore, the bus bar group 91 consists of the fourth-layer bus bars 351 and 354 shown in FIG. 4. The bus bar group 92 consists of the fifth-layer bus bars 361 and 364 shown in FIG. 4. The bus bar group 93 consists of the sixth-layer bus bars 371 and 374 shown in FIG. 4.

As shown in FIG. 5, the bus bar groups 81 to 83 are disposed successively in the axial direction from the end face of the core back 120 at the position near the tooth coils 20. Similarly, the bus bar groups 91 to 93 are disposed successively in the axial direction from the end face of the core back 120 at the position slightly far from tooth coils 20. It is preferable that these six bus bar groups 81–83 and 91–93 are accommodated in respective grooves of a resin-made bus bar holder. It is also preferable to use a resin base for electrically insulating these bus bar groups from the core back 120.

However, it is not necessary to dispose all of the bus bar groups shown in FIG. 5 at the same circumferential position. In this respect, FIG. 5 merely shows the arrangement of respective bus bar groups seen in the axial direction as well as in the radial direction. Furthermore, the bus bar groups 81–83 and 91–93 are the crossovers extending in the, circumferential direction. If possible, it is preferable to bend the lead wires 23 and 24 toward the circumferential direction.

According to this embodiment, one ends of respective bus bar groups 81–83 and 91–93 (i.e. the crossovers extending in the circumferential direction) are bent inward in the radial direction and extended beyond other bus bar groups to reach the connecting positions of the lead wires of the tooth coil 20. As understood from FIGS. 4 and 5, the bus bar groups 81–83 and 91–93 (i.e. the crossovers extending in the circumferential direction) can easily extend beyond other crossover bus bars. Namely, in FIG. 4, two arbitrary bus bars crossing at an intersection of the bus bars have different axial positions. Thus, the intersectional arrangement is feasible.

More specifically, the lead wire connected to the bus bar 351 does not intersect with the bus bars belonging to the bus bar groups 81 to 83. Next, the lead wire connected to the bus bar 361 is extended outward in the radial direction via the position of the bus bar group 82 in FIG. 5. In this case, as understood from FIG. 4, only the bus bars 351 and 352 are present at the positions of the bus bar groups 91 and 81, respectively. These lead wires do not intersect with the bus bars 351 and 352. Next, the lead wire connected to the bus bar 371 is extended outward in the radial direction via the position of the bus bar group 83 in FIG. 5. In this case, as understood from FIG. 4, only the bus bars 351, 352, 361, and 362 are present at the positions of the bus bar groups 91, 81, 92, and 82, respectively. These lead wires do not intersect with the bus bars 351, 352, 361, and 362. The same explanation is applied to other bus bars.

THIRD EMBODIMENT

A winding stator coil in accordance with a third embodiment of the present invention will be explained with reference to FIG. 6 which schematically shows a modified arrangement of the bus bar groups 81–83 and 91–93. According to this embodiment, the bus bar groups 91 to 93 are disposed successively in the radial direction along the core back 120. The bus bar groups 81 to 83 are disposed successively in the radial direction and are positioned outside the bus bar group 91 to 93 in the axial direction. According to this arrangement, it is necessary to solve the problem of intersection of the radial extended portion of the bus bar being extended in the radial direction and connected to the lead wire of the tooth coil 20 and the circumferential extended portion of other bus bar being extended in the circumferential direction.

According to this and above-described embodiments, the external connecting terminals 35, 36, and 37 are disposed at appropriate positions so that the first phase winding group 8 and the second phase winding group 9 have the same electric resistance for each phase. This is effective in eliminating the difference of the current flowing in the first phase winding group 8 and the current flowing in the second phase winding group 9. Furthermore, according to this and above-described embodiments, the bus bar groups 81–83 and 91–93 are disposed inward than the outer edge of the core back 120 in the radial direction and also inward than the outer edge of the tooth coils 20 in the axial direction. Thus, it is possible to provide an electric rotary machine compact in size and light in weight.

FOURTH EMBODIMENT

Figure 9:
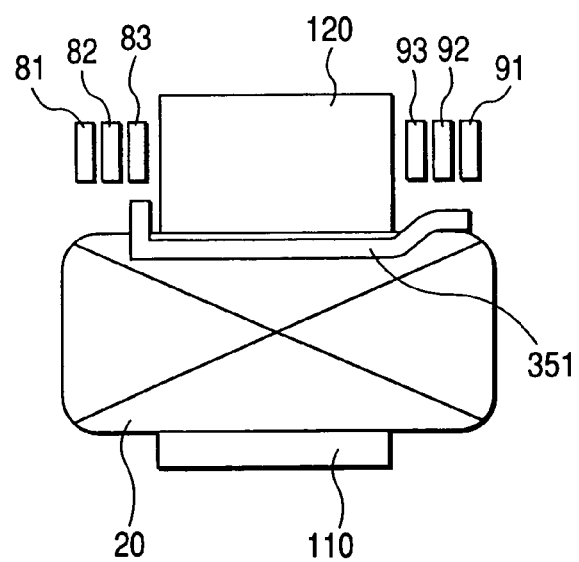
FIG. 9 is a cross-sectional view partly and schematically showing a bus bar arrangement for the three-phase wiring in accordance with the fourth embodiment of the present invention, taken along the plane including the axis of the stator core.

A winding stator coil in accordance with a fourth embodiment of the present invention will be explained with reference to FIG. 7. This embodiment is characterized in that the bus bars arranging the first phase winding group 8 are disposed along one end face of the core back 120 and the bus bars arranging the second phase winding group 9 are disposed along the other end face of the core back 120. To solve the above-described problem of intersection, it is desirable to change the six layers of the bus bars shown in FIG. 3 to the layout of three layers so as to be disposed in the radial direction along the end face of the core back 120. According to this embodiment, the radial width of the core back 120 can be reduced. Namely, the bus bar groups 81–83 and 91–93 are disposed as shown in FIG. 9.

According to this embodiment, the external connecting terminals 35 to 37 and the bus bars of the second phase winding group 9 are disposed at the same side. The bus bars 351, 361, and 371 of the first phase winding group 8 extend in slots of the stator core (i.e. clearances between teeth 110) and are connected to the external connecting terminals 35 to 37, as shown in FIGS. 7 to 9.

Figure 10:
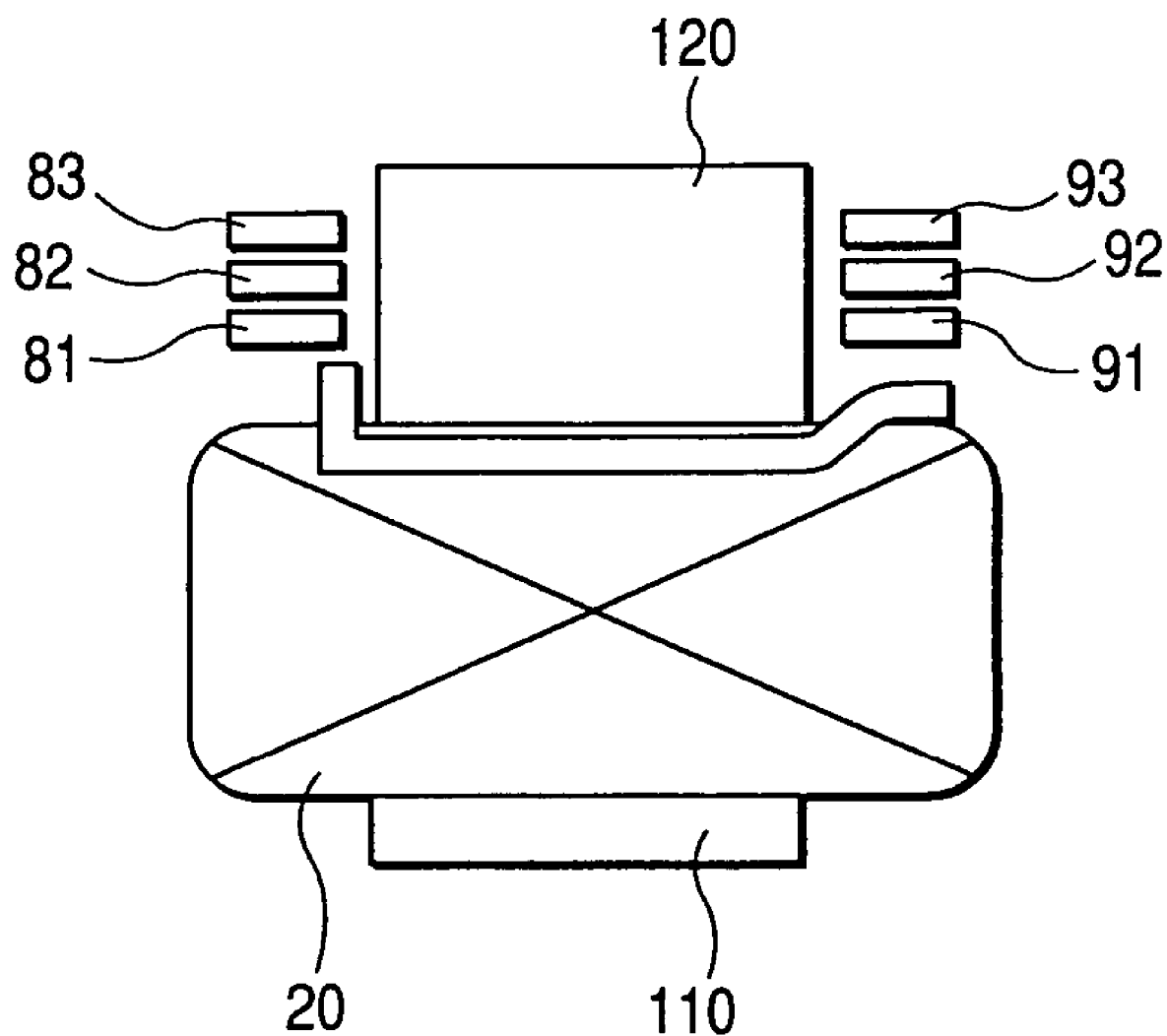
FIG. 10 is a cross-sectional view partly and schematically showing a modified bus bar arrangement for the three-phase wiring in accordance with the fourth embodiment of the present invention, taken along the plane including the axis of the stator core.

To solve the above-described problem of intersection in the bus bar arrangement shown in FIG. 6, it is preferable to locate the bus bars 91, 92, and 93 to the opposite side of the core back 120 to leave only one layer consisting of three bus bars successively disposed in the radial direction along each end face of the core back 120. Namely, the bus bar groups 81–83 and 91–93 are disposed as shown in FIG. 10.

Figure 7:
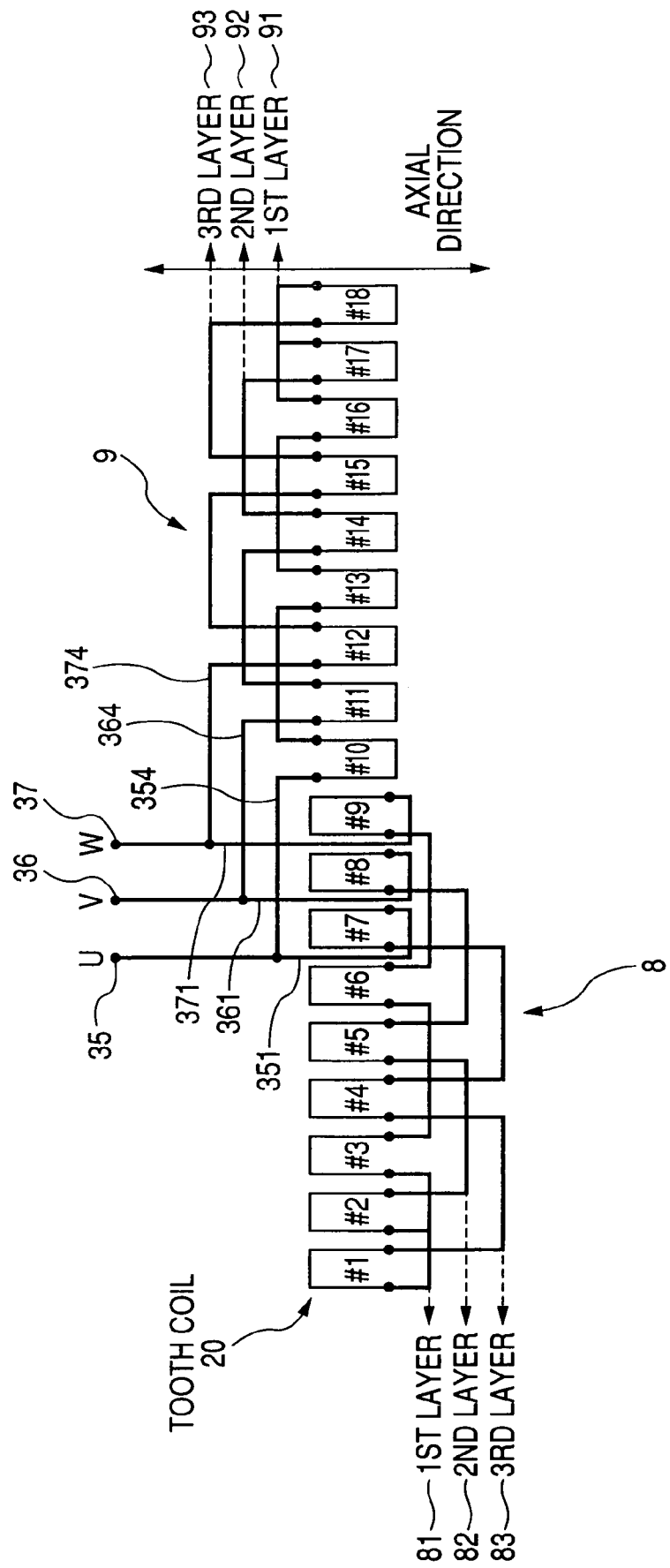
FIG. 7 is a diagram showing a bus bar arrangement for the three-phase wiring in accordance with a fourth embodiment of the present invention.
Figure 8:
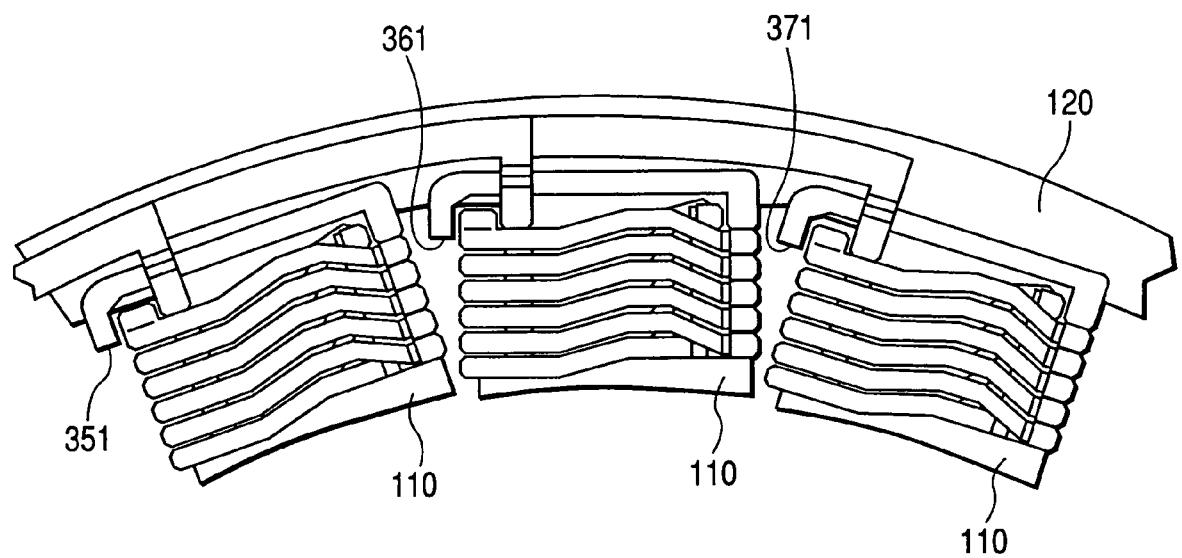
FIG. 8 is a front view partly and schematically showing a bus bar arrangement for the three-phase wiring in accordance with the fourth embodiment of the present invention, taken along the plane including the axis of the stator core.
Figure 11:
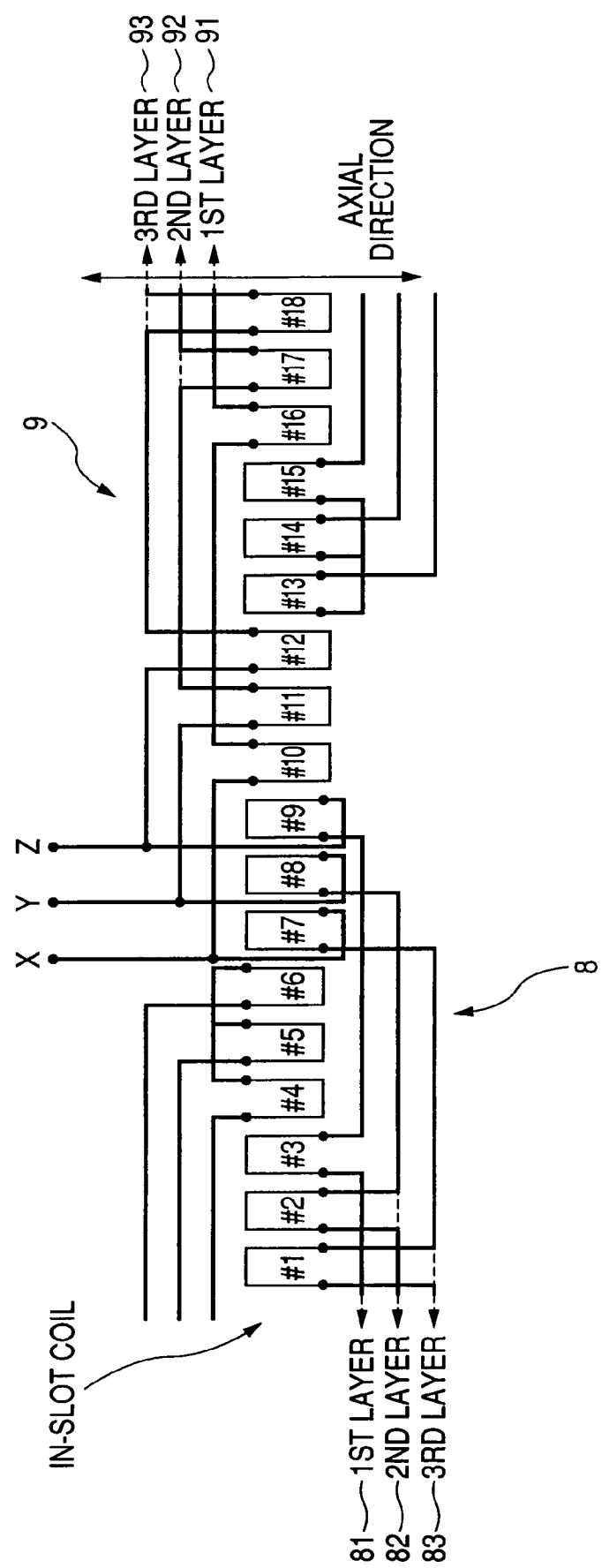
FIG. 11 is a diagram showing a bus bar arrangement for the three-phase wiring in accordance with the fourth embodiment of the present invention.

FIG. 11 shows a modified wiring arrangement for the bus bar groups 81–83 and 91–93 shown in FIG. 7. The bus bar groups 81 to 83 arrange the first phase winding group 8 by connecting the tooth coils #1–#3, #7–#9, and #13–#15. The bus bar groups 91 to 93 arrange the second phase winding group 9 by connecting the tooth coils #4–#6, #10–#12, and #16–#18.

FIFTH EMBODIMENT

A winding stator coil in accordance with a fifth embodiment of the present invention will be explained with reference to FIG. 12. This embodiment is characterized in that the external connecting terminals 35 to 37 are disposed adjacently to the outer cylindrical surface of the core back 120 and positioned at the central region of the core back 120 in the axial direction. According to this embodiment, the bus bars 351, 361, 371, 354, 364, and 374 are extended along the outer cylindrical surface of the core back 120 and connected to the external connecting terminals 35 to 37.

Figure 12:
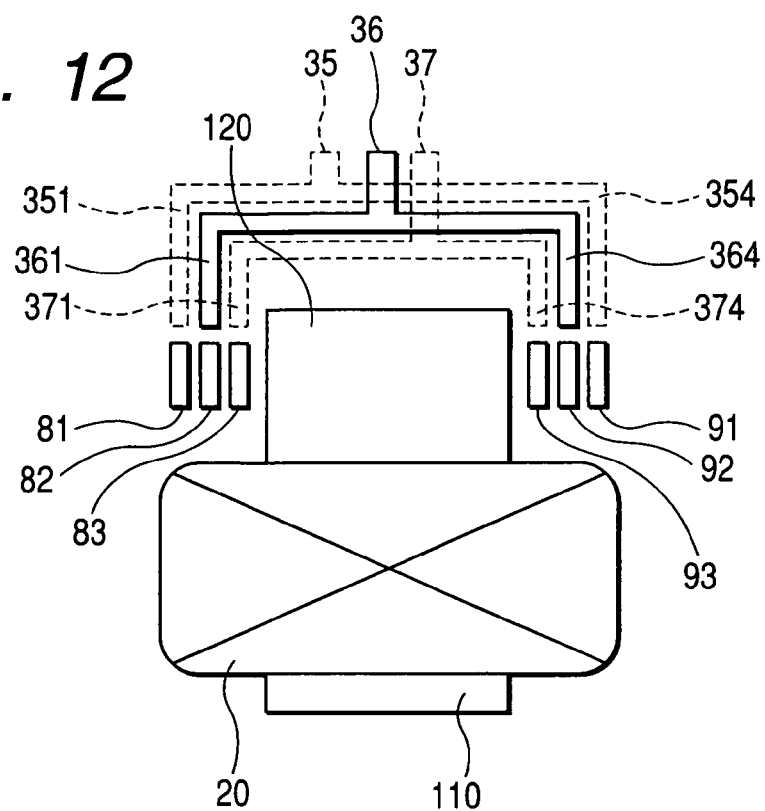
FIG. 12 is a cross-sectional view partly and schematically showing a bus bar arrangement for the three-phase wiring in accordance with a fifth embodiment of the present invention, taken along the plane including the axis of the stator core.
Figure 13:
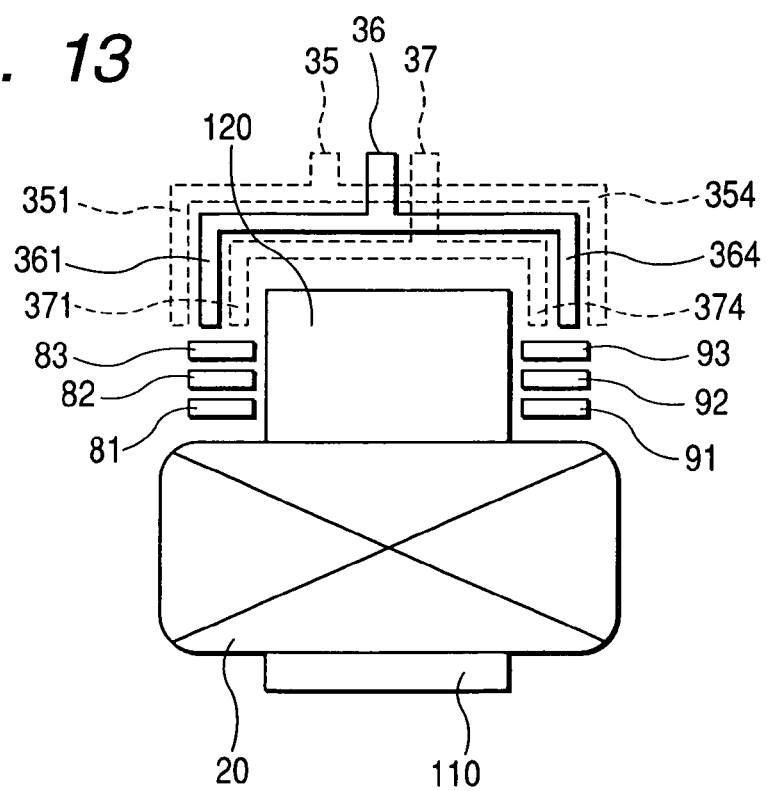
FIG. 13 is a cross-sectional view partly and schematically showing a modified bus bar arrangement for the three-phase wiring in accordance with the fifth embodiment of the present invention, taken along the plane including the axis of the stator core.

FIG. 13 shows a modified wiring arrangement for the bus bar groups 81–83 and 91–93 shown in FIG. 12, and is different in that the bus bar groups 81–83 and 91–93 are disposed successively in the radial direction.

What is claimed is:

1. A concentrated winding stator coil for an electric rotary machine comprising:
    plural tooth coils respectively wound around teeth of a stator core, each tooth coil comprising:
    a first layer coil consisting of plural turns arranged by successively winding an insulation coated coil conductor around a tooth of said stator core in a direction advancing from a proximal end portion of the tooth to a distal end portion of said tooth to cooperatively form a same layer, the first layer coil having a winding start end disposed at the proximal end portion of said tooth;
    a second layer coil consisting of plural turns, including a start turn continuously returned from a final turn of said first layer coil, arranged by successively winding the insulation coated coil conductor on and around said first layer coil in a direction advancing from the distal end portion to the proximal end portion of said tooth to cooperatively form a same layer, the second layer coil having a winding terminal end disposed at the proximal end portion of said tooth;
    a first lead wire portion extending from said winding start end of the first layer coil toward a core back of said stator core; and
    a second lead wire portion extending from said winding terminal end of the second layer coil toward the core back of said stator core,
    wherein said stator coil further comprises:
    a phase winding including plural inter-coil bus bars serving as inter-coil connection wires, plural terminal bus bars serving as unit terminal connection wires, and a plurality of neutral bus bars,
    said plural inter-coil bus bars serially connect the tooth coils to form a plurality of serial coil units for each of a plurality of phases such that each of said plural inter-coil bus bars connects the first lead wire portion of one tooth coil and the second lead wire portion of another tooth coil and such that a set of serial coil units includes one serial coil unit of each phase to form a plurality of sets of serial coil units.
    each of said neutral bus bars connects first ends of the serial coil units of the same set with one another to connect the serial coil units with one another for each set, each of said plural terminal bus bars extends from second ends of said serial coil units of the same phase to connect said serial coil units in parallel with each other for each phase, said inter-coil bus bars and said terminal bus bars are disposed adjacently to an end face of said core back so as to form a plurality of layers along an axial direction of the stator core in a bus bar accommodation space, and the neutral bus bars are disposed together with the inter-coil bus bars in the bus bar accommodation space to form the same layer as one of those of the inter-coil bus bars such that the neutral bus bars are located so as not to interfere with the inter-coil bus bars.

2. The concentrated winding stator coil for an electric rotary machine in accordance with claim 1, wherein said electric rotary machine is a three-phase AC electric rotary machine, said serial coil units of said phase winding include a first serial coil unit and a second serial coil unit connected in parallel with each other for each phase, each of said first serial coil unit and said second serial coil unit consisting of plural tooth coils being mutually connected in series, first bus bar groups, each including the inter-coil bus bar and the terminal bus bar for said first serial coil unit of each phase, are disposed adjacently to an end face of said core back and mutually spaced with predetermined clearances in a radial direction according to a predetermined phase order, and second bus bar groups, each including the inter-coil bus bar and the terminal bus bar for said second serial coil unit of each phase, are disposed adjacently to an axial end of respective first bus bar groups and mutually spaced with predetermined clearances in the radial direction according to a predetermined phase order.

3. The concentrated winding stator coil for an electric rotary machine in accordance with claim 1, wherein said electric rotary machine is a three-phase AC electric rotary machine, said serial coil units of said phase winding include a first serial coil unit and a second serial coil unit connected in parallel with each other for each phase, each of said first serial coil unit and said second serial coil unit consisting of plural tooth coils being mutually connected in series, first bus bar groups, each including the inter-coil bus bar and the terminal bus bar for said first serial coil unit of each phase, are disposed from a position adjacent to an end face of said core back and mutually spaced with predetermined clearances in an axial direction according to a predetermined phase order, and second bus bar groups, each including the inter-coil bus bar and the terminal bus bar for said second serial coil unit of each phase, are disposed from a position adjacent to the end face of said core back and mutually spaced with predetermined clearances in the axial direction according to a predetermined phase order.

4. The concentrated winding stator coil for an electric rotary machine in accordance with claim 1, wherein said electric rotary machine is a three-phase AC electric rotary machine, said serial coil units of said phase winding include a first serial coil unit and a second serial coil unit connected in parallel with each other for each phase, each of said first serial coil unit and said second serial coil unit consisting of plural tooth coils being mutually connected in series, first bus bar groups, each including the inter-coil bus bar and the terminal bus bar for said first serial coil unit of each phase, are disposed adjacently to one end face of said core back, and second bus bar groups, each including the inter-coil bus bar and the terminal bus bar for said second serial coil unit of each phase, are disposed adjacently to the other end face of said core back.

5. The concentrated winding stator coil for an electric rotary machine in accordance with claim 4, wherein the terminal bus bars of said first bus bar groups of respective phases are connected to the terminal bus bars of said second bus bar groups of corresponding phases at positions adjacent to an outer cylindrical surface of said stator core.

6. The concentrated winding stator coil for an electric rotary machine in accordance with claim 4, wherein the terminal bus bars of either said first bus bar group or said second bus bar group extend in slots of the stator core and are connected to the terminal bus bars of the other of said first and second bus bar groups.

7. The concentrated winding stator coil for an electric rotary machine in accordance with claim 6, wherein respective bus bars belonging to said first bus bar groups and said second bus bar groups are disposed so as to offset toward said stator core from said teeth in the axial direction than the surface of said tooth coils.

8. The concentrated winding stator coil for an electric rotary machine in accordance with claim 1, wherein each of said tooth coils has a turn number which can be regarded as being equivalent to an odd turn number if all of the tooth coils arranging said phase winding are connected in series.

9. The concentrated winding stator coil in accordance with claim 1, wherein the neutral bus bar is disposed together with a portion of the inter-coil bus bars of one phase to form the same layer in an axial direction of the stator core such that the neutral bus bar is located at an area extending in a circumferential direction of the stator core, and the portion of the inter-coil bus bars are not present in the area.

* * * * *